United States Patent Office 3,020,923
Patented Feb. 13, 1962

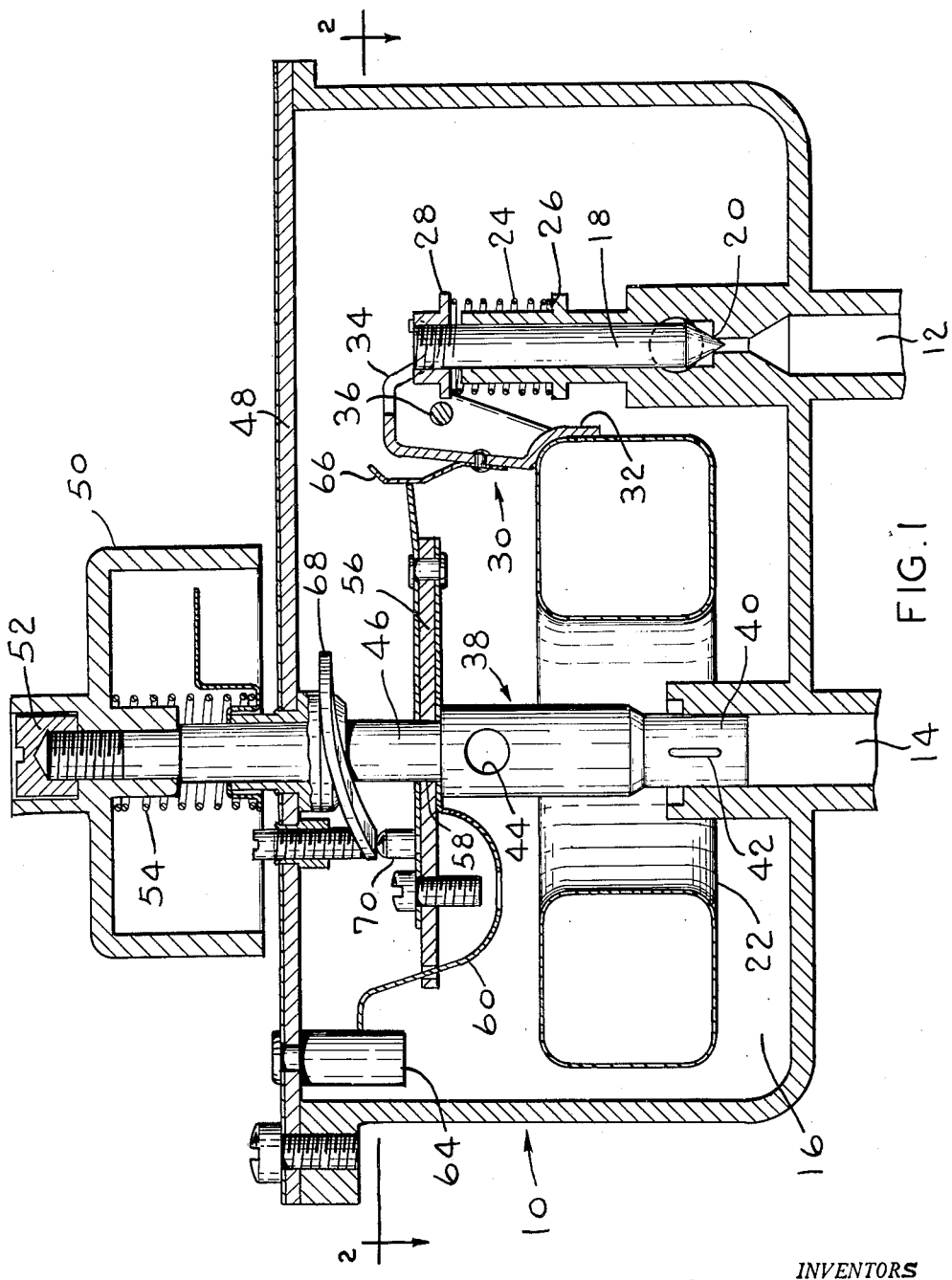

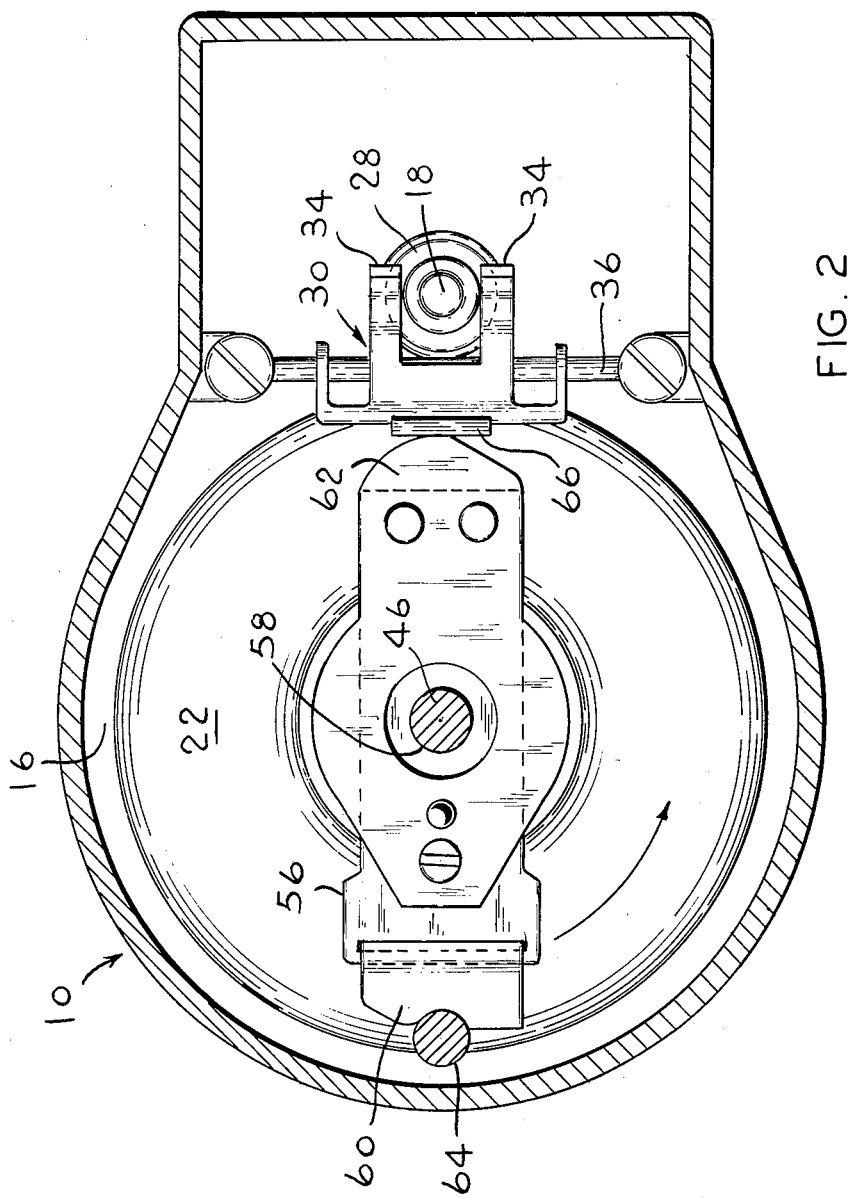

3,020,923
OIL CONTROL
Roy W. Johnson, Milwaukee, and William A. Biermann, Brookfield, Wis., assignors to Controls Company of America, Schiller Park, Ill., a corporation of Delaware
Filed May 15, 1959, Ser. No. 813,491
5 Claims. (Cl. 137—316)

This invention relates to an improvement in fuel flow control devices and more particularly to a small, compact fuel control for use in tent heaters and field kitchens.

These controls are elementary in construction having been utilized by the armed services for many years. One objection to present control devices is the hazard which is created when the control is inadvertently turned off. Since there is no positive indication of shut-off it is possible to turn the valve off when only turning it down. If turned on again, the heat of the burner will vaporize the incoming fuel producing a highly combustible vapor in the burner. It has been further found that in storage and transportation of these control devices, the floats were subject to damage because they were free to move within the chamber. Previous shutdown devices also utilize complicated lever systems that required special maintenance and were therefore not readily adaptable to field use.

The present invention proposes to overcome these disadvantages by interlocking the inlet valve with the outlet control knob in a relatively simple and positive way so that with the control knob in any of its open positions, the inlet valve will be free to respond to the control of its float or other means which coacts therewith to maintain a level of liquid in the chamber. However, when the control knob is in the off position then the interlocking action between the knob and the inlet valve will force the inlet valve closed and retain it closed so long as the control knob is in the off position. The float will then be suspended within the float chamber so that it will not come in contact with the walls and therefore cannot be damaged during handling. The outlet valve which responds to the motion of the control knob will never be fully closed thus allowing the fuel to continue to flow from the float chamber for a short period of time to maintain a pilot flame within the burner. There is also positive shut-off indication due to the detent action of a locking spring to prevent inadvertent shut-off.

One of the principal objects of the invention is to provide a control of this character which simplifies the mechanism that shuts off the flow of fuel.

Another object of this invention is to provide an oil control device which limits the hazard created by inadvertent shut-off.

A further object of the invention is to provide an oil control device which gives a positive indication of shutdown.

A still further object of the invention is to provide a control device that is not subject to damage during handling.

Other objects and advantages will be pointed out in or be apparent from, the specification and claims, as will obvious modifications of the single embodiment shown in the drawings in which:

FIG. 1 is a side elevation partly in section showing an oil control device embodying the present invention with the control knob locked in the off position and the inlet valve fully closed; and FIG. 2 is a sectional view taken on line 2—2 of FIG. 1.

Referring to the drawing, casing 10 is provided with an inlet passage 12 and an outlet passage 14 which are in communication with a float chamber 16. An inlet valve 18 cooperates with a valve seat 20 to control fuel flow to the float chamber and is responsive to the movements of an annular float 22. The float acts against the bias of spring 24 which seats on a shoulder 26 and imparts an upward force against valve cap 28. A valve operating lever 30 interconnects the float and the valve and has an arm 32 connected to the float and a bifurcated arm 34 operatively engaging the cap 28. The lever is pivoted on pin 36 secured to the walls of the casing.

The outlet valve 38 coacts with the outlet passage 14 to control the flow of fuel from the float chamber to the burner. The lower portion of the outlet valve is hollow and has a reduced and tubular lower end 40 slidably fitting in the outlet passage and a metering slot 42. A transverse port 44 is provided in the upper end of the tubular portion above the liquid level in the float chamber to allow proper venting of the valve. The upper end or stem 46 of the valve 38 projects through an opening in the cover 48 of the casing and has a control knob 50 secured thereon by a nut 52. A spring 54 biases the outlet valve upward.

A plate 56 having a central aperture 58 is rigidly secured to the stem 46 and has a spring clip 60 attached at one end and a projection 62 attached at the opposite end. The spring clip 60 locks on a fixed post 64 in the cover 48 when the control knob is in the off position. Simultaneously with the locking of the clip 60 and post 64, the projection 62 engages a spring bracket 66 mounted on the lever 30 forcing the inlet valve downward to shut off fuel flow.

A circular cam 68 is secured to the underside of cover 48 around the valve stem 46 and a cam follower 70 is provided on the upper surface of plate 56 to engage the cam 68. Rotation of the stem 46 by the knob 50 in the direction of the arrow shown in FIG. 2 will release the spring clip 60 from the post 64 and the projection 62 from the bracket 66. The stem will move upward against the cam 68 under the influence of the spring 54 to open the outlet valve 38. Release of the bracket 66 will put the inlet valve under the influence of the float 22.

When the knob 50 is turned off the outlet valve 38 will extend into the passage 14 so that a portion of the metering slot 42 will be in communication with the float chamber to allow the reservoir to drain down to the slot level. The continued flow of fuel into the burner will maintain a pilot flame for a short period of time so that the burner may be turned on again without relighting.

In operation while the knob 50 is in the off position the stem is locked from rotation by clip 60 and post 64 and the inlet valve is biased to a closed position by projection 62 and spring bracket 66. The float will be suspended within the float chamber by the spring bracket 66. Upon rotation of the knob 50 the inlet valve is released to the float system and fuel will start to fill the reservoir to the desired level. When the reservoir has been filled the float 22 and lever 30 will close the inlet valve shutting off further fuel flow. Rotation of the stem will cause the cam follower 70 to ride against the cam 68 under the influence of the spring 54 moving the valve 38 upward to further open the outlet passage 14. The metering slot 42 insures that a continuous flow of fuel will be fed to the burner for a short period of time after shutdown. Actual shut-off will only occur when the inlet valve has been closed and the float chamber substantially drained.

A positive indication of shut-off is given by the detent action of the clip 60 locking on the post 64 thus preventing the possibility of shutting off the valve inadvertently. Suspending of the float within the chamber reduces the possibilty of damage through handling but creates a cantilever condition between the float and the lever 30. The stresses resulting at the connection between the float and the lever due to the cantilever condition are cushioned by the action of the spring bracket 66. A further advanatge inherent in this arrangement is the ease with which the valve can be disassembled for field service. The operating mechanism can be removed by merely lifting the outlet valve from the chamber.

Although but one embodiment of the present invention has been illustrated and described, it will be apparent to those skilled in the art that various changes and modifications may be made therein without departing from the spirit of the invention or from the scope of the appended claims.

We claim:

1. An oil control device of the character described comprising a casing having a fuel chamber including an inlet and an outlet, means for regulating flow through the inlet, float means in the chamber to control the inlet regulating means, stem means for regulating flow through the outlet, said stem means being rotatable to an "on" and an "off" position, a fixed post within the chamber, spring means rotatable with the stem means to engage the post when the outlet regulating means is in the "off" position, a metering slot in the stem means to drain the supply chamber when the stem means is in the "off" position, a resilient bracket secured to the float means, and a projection rotatable with the stem means to engage the bracket and resiliently suspend the float means within the chamber when the stem means is in the "off" position.

2. An oil control device of the character described comprising, a casing having a chamber including an inlet and an outlet, inlet regulating means for the inlet including means responsive to the liquid level of the chamber, outlet regulating means having an "on" and "off" position, means for locking the outlet regulating means to the casing when in the "off" position, said outlet means remaining partly open in the "off" position, and means on the outlet regulating means for closing the inlet regulating means so that the responsive means is resiliently suspended within the chamber.

3. An oil control device of the character described comprising, a casing having a chamber including an inlet and an outlet, means for regulating flow through the inlet including float means, means for regulating flow through the outlet and having an "on" and "off" position, stationary means mounted within the chamber, spring means secured to the outlet regulating means for engaging the stationary means when the outlet regulating means is in the "off" position, spring means mounted on the inlet regulating means, and a projection on the outlet regulating means for engaging the spring inlet means to close the inlet regulating means when the outlet regulating means is in the "off" position and resiliently suspending the float means.

4. An oil control device of the character described comprising, a casing having a fuel chamber including an inlet and an outlet, means for regulating flow through the inlet, float means in the chamber to control the inlet means, means for regulating flow through the outlet, said outlet means being rotatable to an "on" and "off" position, a stationary post mounted within the chamber, a spring secured to the outlet means and rotatable therewith to engage the post when the outlet means is in the "off" position, an aperture in the outlet means to drain the supply chamber when the outlet means is in the "off" position, a bracket secured to the float means and operatively engaging the means for regulating flow through the inlet, and a projection rotatable with the outlet means to engage the bracket when the outlet means is in the "off" position so that the bracket closes the means for regulating flow through the inlet and resiliently suspends the float means within the casing.

5. An oil control device of the character described comprising, a casing having a chamber provided with an inlet and an outlet, an inlet valve regulating flow through the inlet, means controlling said valve to maintain a liquid level in the chamber, an outlet valve regulating flow through the outlet, said outlet valve being rotatable in one direction to reduce fuel flow and rotatable in the opposite direction to increase fuel flow, means rotatable with the outlet valve biasing the inlet valve closed to shut off fuel flow and resiliently suspending the controlling means independent of the liquid level in the chamber, and locking means rotatable with the outlet valve to indicate that the inlet valve has been closed.

References Cited in the file of this patent
UNITED STATES PATENTS

| | | |
|---|---|---|
| 756,491 | Gold | Apr. 5, 1904 |
| 2,183,815 | Johnson | Dec. 19, 1939 |
| 2,427,059 | Landon | Sept. 9, 1947 |
| 2,790,457 | Millerwise | Apr. 30, 1957 |
| 2,869,628 | Kuykendall | Jan. 20, 1959 |